United States Patent

[11] 3,619,445

| [72] | Inventor | Frank A. Carlson, Jr.<br>Pittsford, N.Y. |
|---|---|---|
| [21] | Appl. No. | 749,738 |
| [22] | Filed | Aug. 2, 1968 |
| [45] | Patented | Nov. 9, 1971 |
| [73] | Assignee | Mobil Oil Corporation |

[54] METHOD FOR PRODUCING BIAXIALLY ORIENTED POLYSTYRENE HEAVY GAUGE SHEET
1 Claim, 1 Drawing Fig.

[52] U.S. Cl. ................................................. 264/95,
264/290
[51] Int. Cl. ................................................... B29d 7/02
[50] Field of Search ........................................... 264/95, 99, 209, 290; 18/14 A, 14 S, 14 M

[56] References Cited
UNITED STATES PATENTS

| 2,346,228 | 4/1944 | Merrill et al. ............... | 264/169 X |
| 2,720,680 | 10/1955 | Gerow ....................... | 264/209 X |
| 2,987,765 | 6/1961 | Cichelli ...................... | 264/95 |
| 2,987,767 | 6/1961 | Berry et al. .................. | 264/95 |
| 3,092,874 | 6/1963 | Fallwell ...................... | 264/95 X |
| 3,142,865 | 8/1964 | Richie et al. ................. | 264/99 |
| 3,170,011 | 2/1965 | Cheney et al. ................ | 264/95 |
| 3,403,203 | 9/1968 | Shirmer ...................... | 264/95 X |
| 3,457,337 | 7/1969 | Turner ....................... | 264/173 |

Primary Examiner—Robert F. White
Assistant Examiner—T. J. Carvis, Jr.
Attorneys—Oswald G. Hayes, Andrew L. Gaboriault and Hastings S. Trigg ABSTRACT: Biaxially oriented heavy gauge polystyrene sheet is produced by initially extruding a tube of thermoplastic material readily workable over a forming and cooling mandrel, preferably a foamed polystyrene tube from an annular extrusion orifice of an extruder containing polystyrene admixed with a nucleating agent and a foaming agent, passing the tube (or other workable thermoplastic) over a forming and cooling mandrel having a diameter larger than the orifice, slitting the tube and taking up sheets on takeup rolls, wherein the tube between the orifice and the mandrel is supported by injecting a gaseous medium (e.g., air) insided the tube. Thereafter, in the case of polystyrene foam initiation, the addition of nucleating agent and foaming agent is discontinued, extrusion temperature is adjusted, and the rate of injection of gas inside the tube is adjusted to an amount that a gas cushion forms between the polystyrene tube and the mandrel, and the operation is continued to produce clear oriented polystyrene sheet.

PATENTED NOV 9 1971
3,619,445
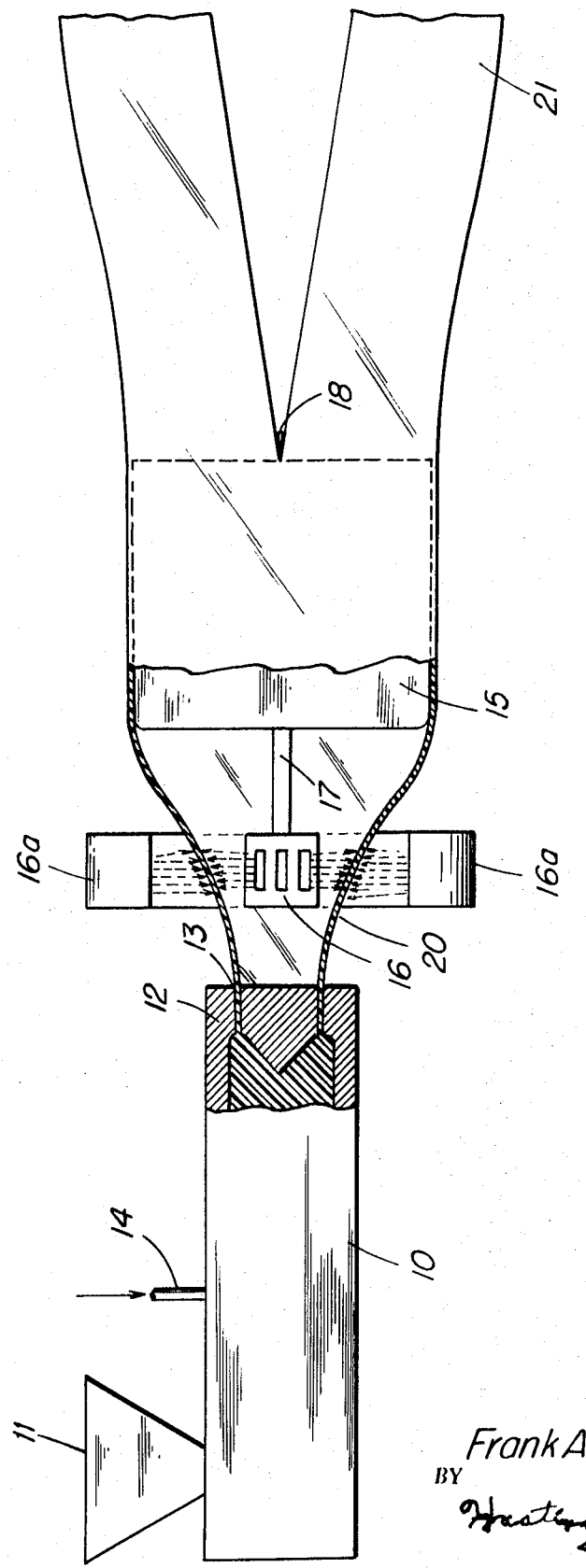
INVENTOR.
Frank A. Carlson, Jr.
BY Hastings S. Trigg
Attorney

METHOD FOR PRODUCING BIAXIALLY ORIENTED POLYSTYRENE HEAVY GAUGE SHEET

BACKGROUND OF THE INVENTION

1. Field of the Invention

The present invention is directed to the production of heavy gauge biaxially oriented polystyrene sheets. It is more particularly concerned with the method for producing such sheets by a tube extrusion process.

2. Description of the Prior Art

As is well known to those familiar with the art, two basic forms have been used to biaxially orient thermoplastic polymers, viz tubular and flat film. The tubular method, in which an extruded tube is pulled in the machine direction and blown to a bubble, is limited to producing films of about 2 mils thickness and less. It is not applicable to producing heavy gauge sheets i.e., films 5–20 mils in thickness, because of heat transfer problems. In the flat film method, an extruded flat film is pulled in the machine direction and stretched laterally by means of a tenter frame. The flat film method can be used to biaxially orient heavy gauge sheet, but presents control difficulties. Insofar as is now known, the process of this invention has not been proposed for manufacturing biaxially oriented heavy gauge polystyrene sheet.

SUMMARY OF THE INVENTION

This invention provides a method for producing biaxially oriented heavy gauge polystyrene sheet that comprises initially extruding a tube of thermoplastic material, readily workable over a forming and cooling mandrel, from an annular extrusion orifice of an extruder, passing said tube over a forming and cooling mandrel having a diameter larger than that of the orifice, slitting the tube and taking up sheets on takeup rolls, wherein the tube between the orifice and the mandrel is supported and cooled by injecting a cooling gaseous medium (e.g., air) inside the tube; and, thereafter, tube extrusion from the extruder is continued with polystyrene without nucleating agents or foaming agents, the extrusion temperature is adjusted and the rate of injection of cooling gas inside the tube is adjusted to an amount that a gaseous cushion forms between the polystyrene tube and the mandrel, and the operation is continued to produce biaxially oriented polystyrene of heavy gauge.

BRIEF DESCRIPTION OF THE DRAWING

The drawing presents a diagrammatic representation of a side view, partly in section, of apparatus utilizable to practice the process of this invention.

DESCRIPTION OF SPECIFIC EMBODIMENTS

It has been found that, when a tube of clear polystyrene is formed, it is virtually impossible to work the hot tube over a forming mandrel. Either the extrudate is too sticky or lacks melt strength or if in the rubbery stage is too difficult to stretch over the mandrel without rupture. Also, contact with the mandrel can cool the polystyrene to brittle polystyrene before it is oriented. Thus, as indicated hereinbefore, the process is initiated with a foamed polystyrene tube or other workable thermoplastic, which is readily worked over the forming mandrel. Surprisingly, it was discovered that, once the foamed tube was established and in operation, foaming could be discontinued and the operation continued to produce clear, oriented polystyrene film.

Within the contemplation of this invention, any thermoplastic material that forms a tube workable over a forming and cooling mandrel can be used in the initial stage of the process. Thus, there can be used materials, such as polyethylene, clear or foamed; and other polyolefin foams. It is preferred, however, to commence operation with extruder foamed or with foamable or expandable polystyrene. This is because the initiating polystyrene foam can easily be reclaimed and reused, whereas other initiating thermoplastics may not. The invention is described using extruder-foamed polystyrene.

In the drawing, there are shown a conventional extruder 10, provided with a loading hopper 11, and a die 12 having an annular extrusion orifice 13, and an inlet line 14 for the injection of foaming agent; a forming and cooling mandrel 15 having a diameter larger than that of the orifice 13; gas distribution means 16 supplied with gas and supported on the forward face of the mandrel 15 by a line 17; and knives or slitters 18 adapted to slit the tube after it has passed over the mandrel 15.

Any conventional foam extruder can be used, such as apparatus shown in copending application Ser. No. 506,836, filed Nov. 8, 1965. The mandrel 15 is generally circular in cross section and has a diameter substantially greater than that of the orifice. In general, this diameter will be between two and about six times the diameter of the orifice. The mandrel 15 is coaxially arranged with the orifice 13.

In operation, polystyrene beads or pellets admixed with nucleating agents are fed to the extruder 10 through the hopper 11. Suitably, the polystyrene and nucleating agents are admixed in a drum tumbler, ribbon blender, or other suitable dry mixing apparatus. In the extruder, the polystyrene is conveyed by a screw, not shown, through successive zones wherein it is compacted and melted, injected with a foaming agent via line 14, thoroughly mixed, and cooled to extrusion temperature. A typical foaming operation of this type is described in copending application Ser. No. 506,836.

The polystyrene is then extruded through the annular orifice 13 of the die 12 to form a foamed polystyrene tube 20. This tube is positioned over the mandrel 15 so that, as the tube is withdrawn in the machine direction from the die 12, the diameter of the tube is increased. As it passes over the mandrel 15, the tube is cooled by internal cooling means supplied to the mandrel to below the glass transition temperature. Then the tube 20 contacts the knives or slitters 18 and is slit longitudinally and opened to form sheets 21. These sheets are then passed through a draw roll assembly, not shown, and thence to takeup rolls, not shown. In order to prevent collapse of the tube between the die 12 and the mandrel 15 and to cool it to a workable rubbery state, a gas, usually air, is introduced via line 17 and distributed through the distribution means 16 in an amount to support the tube but not necessarily at a force that it passes between the tube 20 and the mandrel 15 so as to prevent direct contact of the tube with the mandrel, but such force can be used. Additional external cooling can be effected by introducing air or other gas from an air ring 16a located around the tube 20.

After the foam operation is established, the addition of the nucleating agent and the foaming agent is discontinued. The foamed tube changes over to a clear polystyrene tube and the operation continues to form clear sheet. It was found, however, that adjustments had to be made. Thus, the temperature at the die head had to be increased to a flowable temperature (about 320–355° F.). Also, the clear tube tends to develop undesirable longitudinal scratches upon contact with the mandrel 15. The scratching is avoided by increasing the gas flow rate so that gas flows out between the tube and the mandrel to form a gas cushion, then substantially preventing physical contact of the tube with the mandrel.

In the aforedescribed operation, the foaming agent was admixed with the polystyrene in the extruder. It will be appreciated, however, that the process is not limited thereto. Thus, the initial stage of the process can be carried out using foamable or expandable polystyrene beads or pellets that contain a foaming agent and often a nucleating agent. Such beads or pellets are readily available commercially. Then, after the foam operation is established, the process is switched to clear film production by replacing the feed of foamable beads or pellets to the extruder with clear polystyrene beads or pellets. Although the method of this invention has been illustrated with clear polystyrene, it will be appreciated that the polystyrene can contain a colorant if desired.

The process of this invention is not dependent upon, or is to be limited to, any particular nucleating agent (cell size control agent) or foaming agent. Any such materials well known in the art can be used. Typical nucleating agents used to control cell size are finely divided calcium silicates and certain other salts, as disclosed in U.S. Pat. No. 2,911,382. U.S. Pat. No. 3,151,192 discloses the use of mixtures of sodium bicarbonate with organic acids, such as citric acid, to control pore size. Other materials are disclosed in copending application Ser. No. 506,836. The total amount of nucleating agent, based upon the weight of polystyrene, is generally below 5 percent and preferably between about 0.1 and 3 percent.

Typical foaming or blowing agents are volatile organic liquids, such as butane, hexane, and petroleum ether. Pentane and isopentane are preferred. The amount of foaming agent used, by weight of polystyrene, is generally between about 3 and about 7 percent.

The following example illustrates a typical operation in accordance with this invention.

EXAMPLE

Polystyrene pellets of approximately 1/16-inch diameter were admixed in a drum-tumbler with sodium bicarbonate, citric acid hydrate, and anhydrous citric acid to provide a thorough mix comprising 0.50 percent sodium bicarbonate, 0.60 percent citric acid hydrate and 0.32 percent anhydrous citric acid, by weight of the polystyrene resin. The mixture of polystyrene pellets and cell size control additive mixture was discharged into the feed hopper of a screw extruder. The charge progressed from the feed zone of the extruder to the heat plasticizing zone which was maintained at a temperature of from about 400 to about 450° F. The resulting molten mass was then progressed by the continuous rotation of the forwarding screw to the injection zone where approximately 5 percent by weight (based on the total weight of polystyrene) of liquid pentane was pumped into the molten resin at a pressure of approximately 2,000 pounds/square inch, with the temperature in the injection zone maintained at approximately 400° to 450° F. The pentane-molten polymer mixture was then forwarded to the mixing zone of the extruder, which was maintained at a temperature of approximately 400° to 450° F., wherein the liquid pentane and molten polystyrene were thoroughly mixed. The molten mixture was subsequently forwarded to the cooling zone of the extruder where, by circulation of cooling fluids through the temperature control jacket surrounding the surface of this portion of the extruder, the temperature of the molten mixture was reduced from about 400°–450° F. to a temperature of about 250°–265° F. at the terminal portion of the cooling zone of the extruder. Finally, the molten mixture was extruded through an annular die 1.5 inches in diameter affixed to the terminal end of the extruder adjacent to the cooling zone thereof, whereupon a tube of foam polystyrene was formed. This tube was drawn over a mandrel 6 inches in diameter and, as it left the mandrel, slit to form two sheets of foamed polystyrene. These sheets passed through draw rolls and were loaded onto takeup rolls. To prevent collapse of the tube, air was injected inside the tube between the die and the mandrel at a rate sufficient to support and cool the tube to a rubbery state, above glass transition temperature.

After the foam production was well in continuous operation, it was switched to clear film production by changing the feed to the hopper to polystyrene pellets without added cell size control agents and the injection of liquid pentane was discontinued. The temperature in the cooling zone was adjusted to 320°–325° F. The rate of air injection inside the tube between the die and the mandrel was increased so that air flowed between the tube and the mandrel, to prevent physical contact of the tube with the mandrel. There were obtained clear sheets (8.5 mils) having the following properties:

|  | Direction | |
| --- | --- | --- |
|  | Machine | Transverse |
| Tensile, p.s.i. (ASTM-D882) | 9177 | 9012 |
| Elongation, % | 6.6 | 3.4 |
| Shrinkage, % | | |
| 5 minutes at 130° C. | 67 | 60 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:

1. A method for producing biaxially oriented heavy gauge polystyrene sheet that comprises initially extruding a tube of foamed polystyrene from an annular extrusion orifice of an extruder, passing said tube over a forming and cooling mandrel having a diameter larger than that of the orifice, slitting the tube and taking up a sheet or sheets on takeup a roll or rolls, wherein the tube between the orifice and the mandrel is supported and cooled by injecting a cooling gaseous medium inside the tube; and, thereafter, tube extrusion from the extruder is continued with polystyrene without nucleating agents or foaming agents, the extrusion temperature is adjusted and the rate of injection of cooling gas inside the tube is adjusted to an amount that a gaseous cushion forms between the polystyrene tube and the mandrel, and the operation is continued to produce biaxially oriented polystyrene sheet of heavy gauge.

* * * * *